Oct. 28, 1941.  A. KRUCZEK  2,260,995
MOUNTING FOR VISES
Filed Dec. 23, 1939
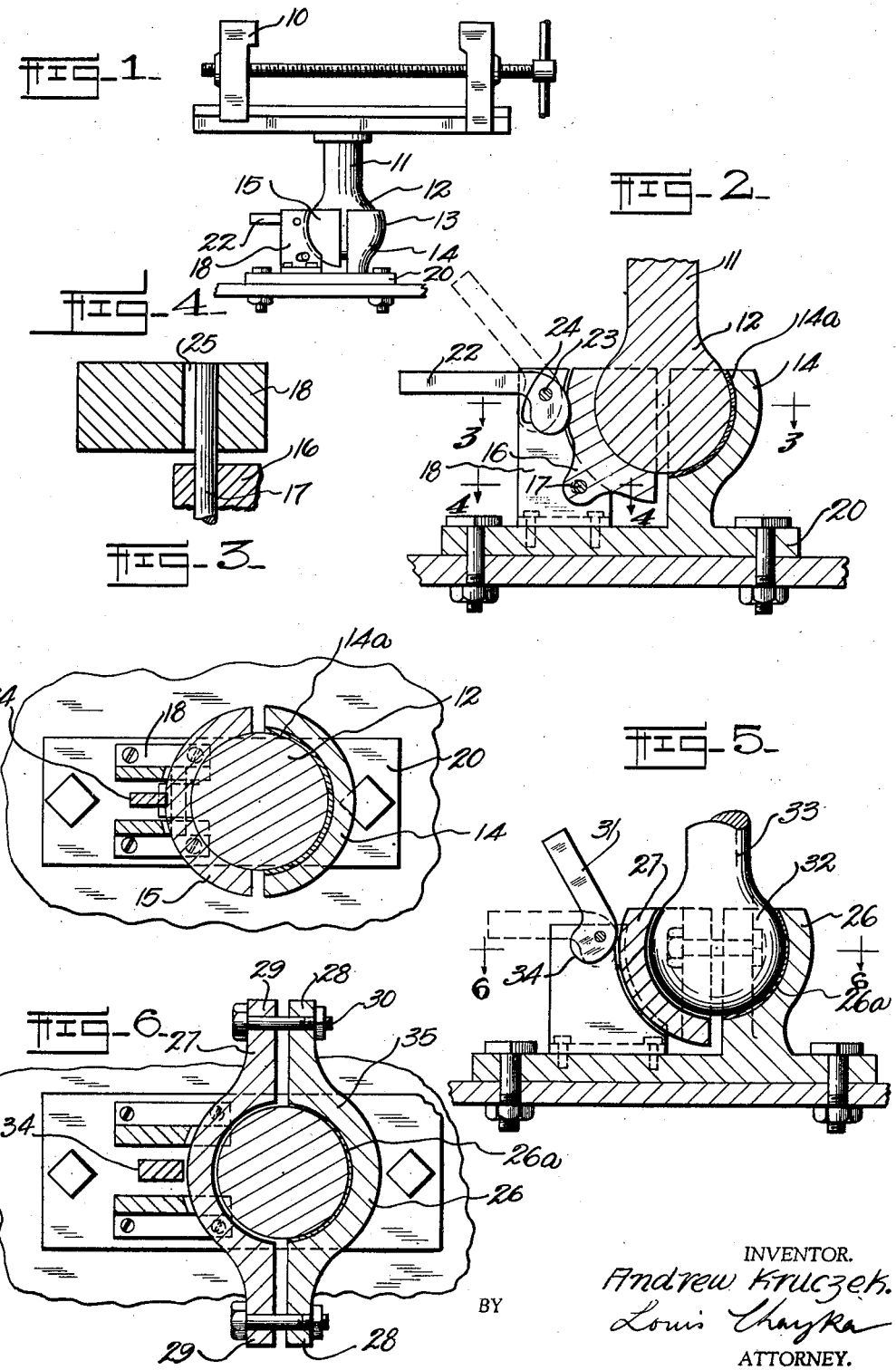
INVENTOR.
Andrew Kruczek.
Louis Chayka
BY
ATTORNEY.

Patented Oct. 28, 1941

2,260,995

UNITED STATES PATENT OFFICE 2,260,995

MOUNTING FOR VISES

Andrew Kruczek, Detroit, Mich.

Application December 23, 1939, Serial No. 310,751

1 Claim. (Cl. 287—21)

The purpose of my invention is to provide a new and useful mounting for conventional vises so that these vises may be set at any angle which may be best suited to the work to be performed in said vise. The conventional vise set permanently in a horizontal or other position was sometimes not capable of clamping the object to be worked in a manner which would be most convenient for the person working on same. It was my experience which suggested the solution of the problem that instead of setting the object to be worked at an angle, it would be easier at times to set the vise itself at such an angle. The purpose, therefore, of my invention was to provide a means of simple construction and readily adjustable, which would permit the conventional vise to be set at any angle desired, within certain practical limits.

I shall now describe in detail my improvement in mountings for vises, in which:

Fig. 1 shows a side view of a vise supported by my improved mounting.

Fig. 2 shows a sectional view of the mounting shown in Fig. 1.

Fig. 3 shows a transverse sectional view of my improved mounting taken on line 3—3 of Fig. 2.

Fig. 4 shows a fragmentary sectional view of part of my improved mounting taken on line 4—4 of Fig. 2.

Fig. 5 shows a partly sectional view of another variety of my mounting.

Fig. 6 shows a transverse sectional view of the mounting taken on line 6—6 of Fig. 5.

Similar numerals refer to similar parts throughout the several views.

The vise in its conventional form, indicated by numeral 10, is supported by a joint or column 11 terminating in a ball 12. The latter is located in a semi-spherical split socket 13 composed of two members or shells 14 and 15. Member 14 is integrally connected with base 20, while member 15, being the complementary part of the socket 13, is provided on its outer surface with an ear 16. By means of said ear, member 15 is hinged on pin 17, the ends of which are held by plates 18. Together members 14 and 15 form a hollow sphere cut off at the top and serve to accommodate ball 12 supporting joint 11 in such a manner that said joint may be inclined within limits permitted by the construction of the socket towards the base 20 at any angle that may be desirable and convenient. In order to secure a better frictional contact between the ball and shells 14 and 15, at least one of said shells, preferably 14, is provided with a suitable lining 14a.

The lining may be of the same kind as is used for brakes in automobiles, although it may be made of some other substance.

Normally, said ball is adapted to be moved about in its socket freely without friction. When, however, said ball has been set at a desired angle, it may be secured firmly in the desired position by means of a cam arrangement acting upon the movable member or shell 15 of the socket 13. The cam arrangement comprises a lever 22 which is adapted to be operated manually, and a cam shoulder 24 turning around fulcrum 23. The lever is normally in a position shown by line 22a, at which time the shell 15 is loosely held in position, particularly since the bearing supporting pin 17 is slotted as shown in Fig. 4. The bearing is indicated by numeral 25. When, however, lever 22 is depressed, shoulder 24 bears against the external wall of shell 15, the internal wall of said shell grips the ball 12, forcing the opposite side of it against the lining 14a on the internal wall of member 14.

Plates 18, supporting the cam and the movable shell 15, may be attached to base 20 at a desired position by means of screws or bolts, although it would be possible to have the bases of said plates 18 provided with slots in order that the position of said plates with respect to the stationary part 14 of the socket be adjusted, that is, that they may be more or less spaced from said stationary part 14 of the socket 13.

In Figs. 5 and 6, I am showing a variation of my mounting, eliminating ear 16 shown in Fig. 2. The mounting includes a split socket generally indicated by numeral 35 and consists of two component parts indicated by numerals 26 and 27. The movable member is indicated by numeral 27, while the stationary member is indicated by numeral 26. The latter is provided with a brake lining 26a. The two members contain extensions 28 and 29, laterally projecting from the respective members, and are held together by bolts 30 on which member 27 is adapted to move slidingly in response to the cam action of lever 31.

The position of the lever with respect to the movable shell 27 is analogous to that shown in Figs. 1 to 4, referring to the first described species of the invention. In this case, when lever 31 is in a position as shown in Fig. 5, that is, in an open position, shell 27 is held close enough to the stationary member 26 to retain ball 32 in said socket, but not close enough to exert any pressure thereon. When, however, it is desired to have the joint 33 at a certain angle with respect to the base of the mounting, this is accomplished by having the shoulder 34 of the cam lever 31 bear against the movable shell 27, when the inside wall of said shell grips the ball 32, forcing it against lining 26a on the inside surface of the stationary member 26. When it is desired to release the ball from said position, all that is necessary is to lift the lever upward, whereupon the movable shell may be moved backward to leave a clearance between its internal wall and the surface of the ball.

It will be evident that structurally the mounting described above may be changed without, however, departing from the basic idea underlying the invention. What I, therefore, claim is as follows:

A mounting for an article having a depending supporting column formed with a ball at its lower end, said mounting comprising a base, a hemispherical socket split vertically and having a stationary section and a movable section, the stationary section being fixed at its lower end to said base, bearing plates carried by the base and extending upwardly therefrom in transverse spaced relation to each other, said plates being reduced in width towards their upper ends and having their inner side edges curved longitudinally from their upper ends, lower portions of the bearing plates being formed with horizontally extending slots, an ear extending outwardly from the lower portion of the movable section between said bearing plates, a pin passed through the ear and the slots to mount the movable section for pivotal movement and sliding movement towards and away from the stationary section, and a cam pivotally mounted between upper portions of the bearing plates and having an actuating handle for manually turning the cam about its pivot and into engagement with the movable section to shift the movable section towards the stationary section and cause the ball to be frictionally gripped in the socket between the said sections and the pedestal held at an adjusted angle.

ANDREW KRUCZEK.